Figure 4:
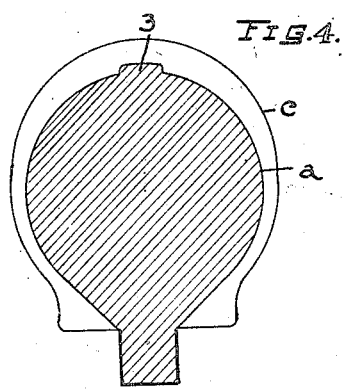

F. G. RENOS.
TIRE CASING.
APPLICATION FILED AUG. 24, 1920.
1,398,975.
Patented Dec. 6, 1921.
2 SHEETS—SHEET 1.
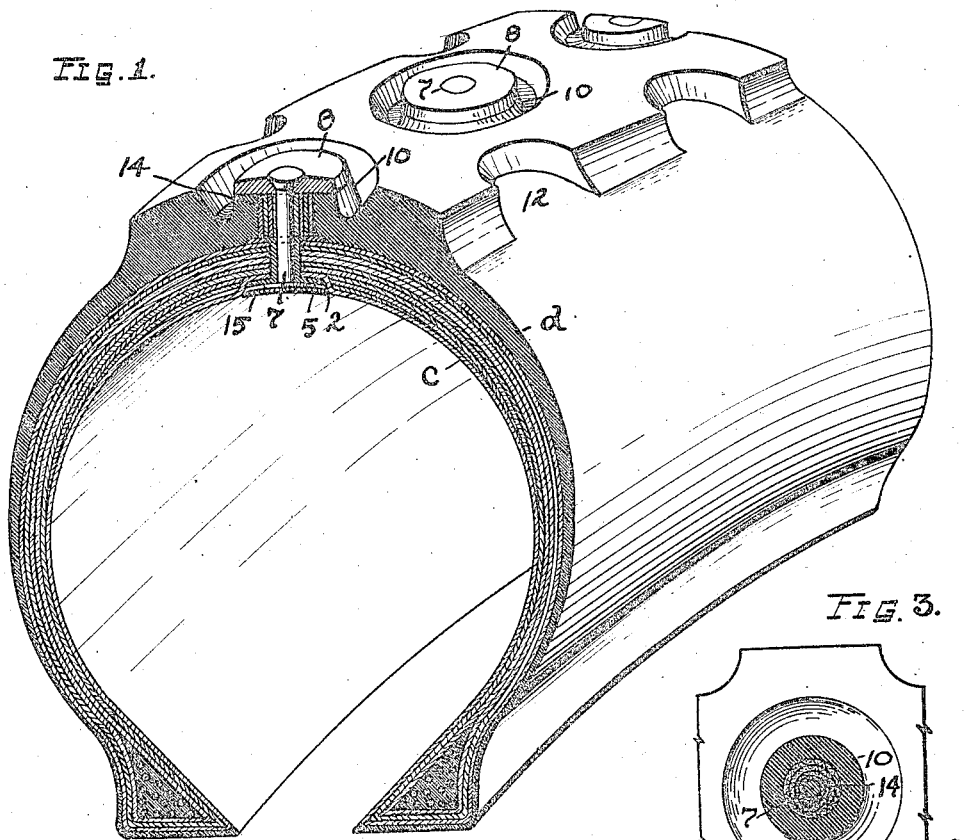
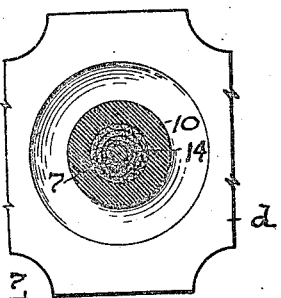
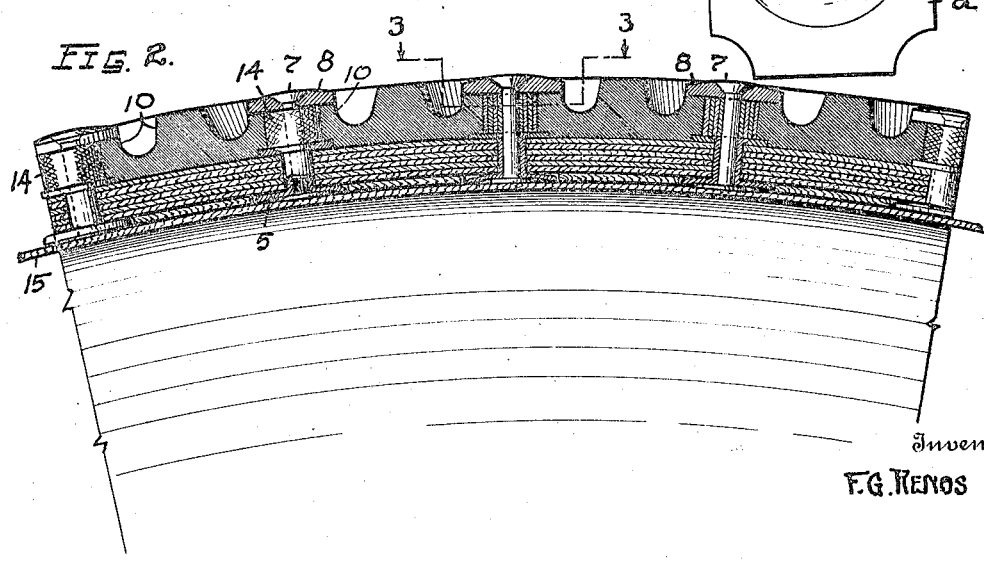
Inventor
F. G. RENOS
By *Fisher & Moatt*
Attorneys

F. G. RENOS.
TIRE CASING.
APPLICATION FILED AUG. 24, 1920.

1,398,975.

Patented Dec. 6, 1921.
2 SHEETS—SHEET 2.

Inventor
F.G. Renos

UNITED STATES PATENT OFFICE.

FRANK G. RENOS, OF AKRON, OHIO.

TIRE-CASING.

1,398,975.  Specification of Letters Patent.  Patented Dec. 6, 1921.

Application filed August 24, 1920. Serial No. 405,635.

*To all whom it may concern:*

Be it known that I, FRANK G. RENOS, a citizen of the United States, residing at Akron, in the county of Summit and State of Ohio, have invented certain new and useful Improvements in a Tire-Casing, of which the following is a specification.

This invention pertains to a new and improved casing for pneumatic tires, all as shown in the accompanying drawings and hereinafter fully described.

In the drawings herewith, Figure 1 is a perspective view of a section of a complete tire casing constructed according to my invention and in one of the preferred forms, and Fig. 2 is a longitudinal sectional elevation through the center of Fig. 1. Fig. 3 is a plan view on the sectional line 3—3 in Fig. 2.

Figure 5:
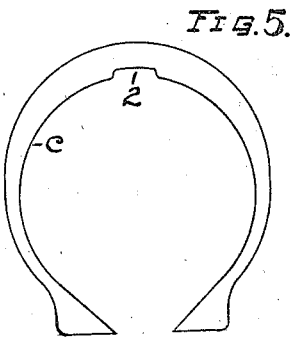
Figure 6:
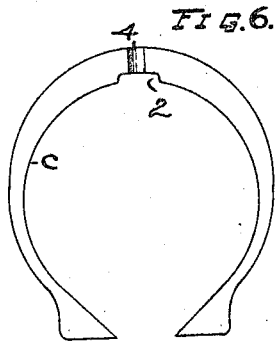
Figure 7:
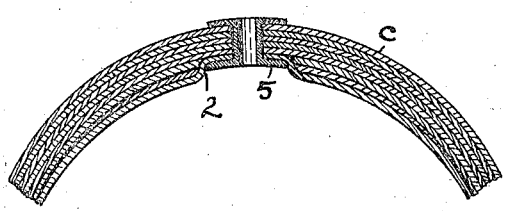
Figure 8:
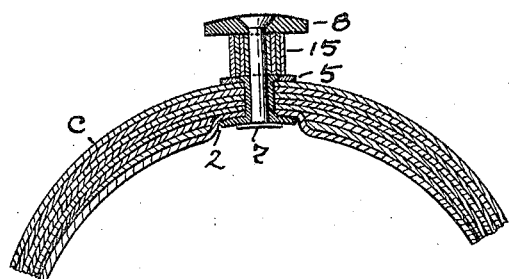
Figure 9:
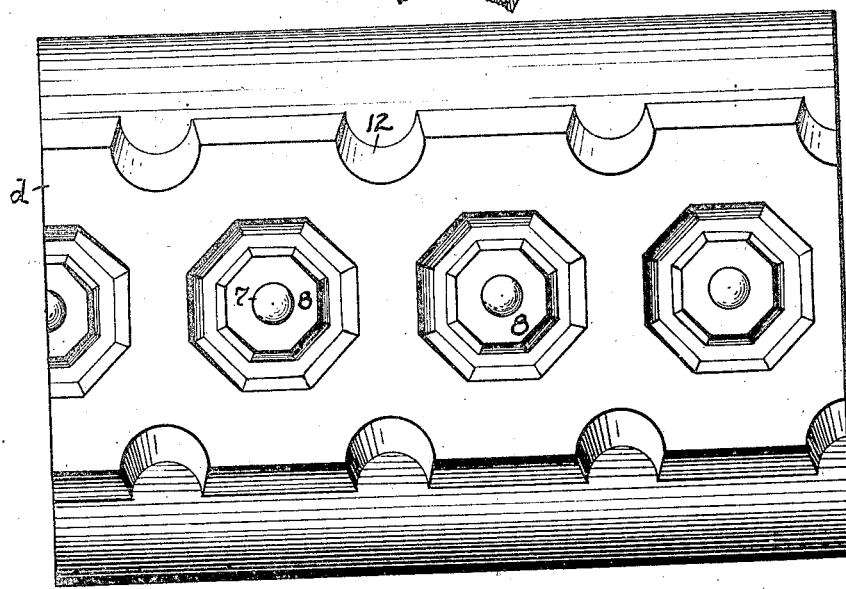

Figs. 4, 5 and 6 have to do more especially with primary steps in the manufacture of the casing and Fig. 4 illustrates a diagrammatic cross section of the so-called carcass and a cross section of a core over which it is formed. Fig. 5 shows a diagrammatic cross section of the said carcass after the core is withdrawn and having an annular depression or channel formed inside in the tread by said core, and Fig. 6 corresponds identically with Fig. 5 in outline, except that it shows one of a series of diametrical holes through the tread in said depression. Fig. 7 is a full line cross section of the outer or tread portion of the carcass and with a tubular rivet or eyelet occupying one of the holes shown in Fig. 6, and Fig. 8 is a cross section corresponding to Fig. 7 with the addition of a rivet spindle through said tubular rivet and an outside washer and an annulus of fabric wound or built about said spindle between said washer and tubular rivet. Fig. 9 is a plan view of a portion of a modified form of the immediate tread portion of the tire casing.

The steps that necessarily obtain in the manufacture of the casing run through Figs. 4 to 8 and into Fig. 1 as a finished product. These steps involve, first the formation of the so-called carcass *c* of the tire casing and which is built up with layers of fabric after the usual manner but with the novel feature of construction seen in the annular depression or channel 2 on the inner side of the tread or periphery of the casing. This channel or depression is rendered necessary to provide accommodation for additional parts entering into the construction of the casing as will presently be seen and is produced by the special form of core *a* shown in Fig. 4, and having a rib 3 about its periphery of the requisite width and depth to produce the said channel when the carcass is developed thereon after the manner shown. The carcass having been thus fabricated with the channel therein, the next step is to bore or form holes 4 at regular and frequent intervals through the tread or periphery of the carcass of a size adaped to receive the tubular rivets 5, and which are provided with relatively wide flanges or upset portions clamping firmly upon opposite sides and with the inner flanges retired within the annular channel 2 at such depth that said flanges cannot work possible injury to the pneumatic tube used within the casing.

Now, assuming that all the said rivets are in position, I proceed next to build in other parts therewith to the end ultimately of providing a tire or tire casing which has the essential advantages of durability and of being practically puncture-proof and non-skidding. The additional or supplemental parts referred to comprise the all rubber outer tread portion *d* of the casing which overlies the carcass within and the special means which recur with each tubular rivet and also are built into said rubber tread *d* through openings therein corresponding to the holes 4 in the carcass. The said openings also come centrally within bosses 10 formed in said tread and have fairly deep channels about them to prevent skidding. However, the invention contemplates firm structural resistance under weight at these recurring points in the tread, and to this end I employ the solid rivet spindle 7 which is upset against the bottom of the tubular rivet and extends through the same and the tread *d* and has a comparatively wide washer 8 resting under the beveled head thereof flat upon said boss 10, and covering the top thereof. The said spindle further has a wrapping of several layers of fabric 14 built about the same between the metal washer 5 and the outer flange of the tubular rivet 5 on which the fabric rests in sustaining relations to said washer or disk. Finally, as a protection to the pneumatic tube, I lay a fabric or fibrous strip 15 within the inner channel 2 of the casing over the heads of the rivets and the entire embodiment is then vulcanized and finished for use.

Any preferred configuration of the tread, such as seen in Fig. 1 or in Fig. 9 with its hexagonal formation may be adopted provided the essential features of construction be preserved, and open circular recesses 12 also are shown in the edges of the raised or tread portion of the casing in which the said bosses and their surrounding channels are developed.

The tubular rivets 5 fixed as they are in the fibrous base of the casing provide an especially firm and durable anchorage for the spindle 7 and washers 8 supplemental thereto and particularly when further strengthened by the heavy fibrous wrapping 14 about the outer half of the spindles in the all rubber tread portion of the casing.

What I claim is:

A tire casing having successive bosses developed in its periphery with depressions about the same and traction means built in and upon said bosses comprising headed rivet spindles extending diametrically through said bosses and anchored on the inner side of the casing and washers on said spindles resting on said bosses.

Signed at Cleveland, in the county of Cuyahoga, and State of Ohio, this 22nd day of July, 1920.

FRANK G. RENOS.